Oct. 6, 1925.
J. M. FELL
TELEGRAPHY
Filed June 29, 1920
1,555,917
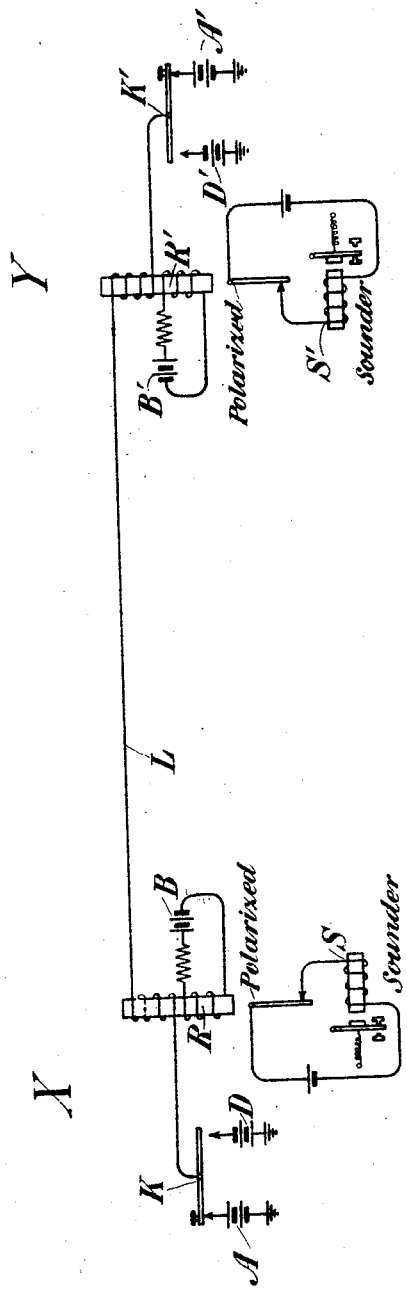
INVENTOR
J. M. Fell
BY
ATTORNEY Patented Oct. 6, 1925.

1,555,917

UNITED STATES PATENT OFFICE.

JOHN M. FELL, OF HACKENSACK, NEW JERSEY, ASSIGNOR TO AMERICAN TELEPHONE AND TELEGRAPH COMPANY, A CORPORATION OF NEW YORK.

TELEGRAPHY.

Application filed June 29, 1920. Serial No. 392,724.

*To all whom it may concern:*

Be it known that I, JOHN M. FELL, residing at Hackensack, in the county of Essex and State of New Jersey, have invented certain Improvements in Telegraphy, of which the following is a specification.

This invention relates to telegraphy, and it is concerned particularly with telegraph systems in which transmission is limited to one direction or the other at a time, which systems are generally designated in the art as "single" telegraph systems.

In the single telegraph systems now in common use the line relays are of the type which is responsive to the presence or absence of line current irrespective of the direction thereof. Systems of this character are troublesome, when used on long lines, due to leakage and capacity. In such instances it is not uncommon to employ a duplex telegraph system modified for one-way operation, the advantage of this system being that it employs relays responsive to the direction of current, as for example, relays with polarized armatures. The duplex systems, however, necessitate the use of balancing artificial lines and other equipment which is expensive to install and troublesome to keep in adjustment.

The object of the present invention is to provide a single telegraph system which employs relays of the type responsive to current reversals, thus securing the operating advantages of these relays for the single systems without the use of balancing artificial lines and similar equipment.

The invention proposes the employment in a system of this character of a relay at each end of the line equipped with a local winding which servies to bias the armature to one position, and a line winding which serves either to oppose and overcome or to augment the biasing force of the local winding according to which station, distance or home, is engaged in transmission. The relay at the distant station is therefore caused to respond to, and the one at the home station is caused to remain unaffected by, the home transmitter. The line windings of the relays are controlled by current in one direction or the other according to which station is engaged in transmission.

A good understanding of the invention may now be had from the following description thereof having reference to the accompanying drawing in which is shown in diagrammatic view one form and arrangement of apparatus embodying the invention.

In this drawing reference character L designates a telegraph line extending between stations X and Y, which stations are provided with similar apparatus designated by like reference characters, prime marks (′) being employed to distinguish the apparatus Y from that of X. A polarized relay R, R′ is provided at each station, each relay having a local winding normally energized by current from a battery B, B′, and a line winding connected between an adjacent transmitting device K, K′ and the line. The transmitting devices are illustrated as keys, but it is understood that other devices, such as the transmitting relays commonly employed in the art, may be used. The front contacts of the keys are associated with batteries A, A′ of positive polarities, and the back contacts thereof with batteries D, D′ of negative polarities. The armatures of the polarized relays govern the circuits of sounders S, S′.

Normally the apparatus is in the position shown in the drawing and there is no flow of current in the line circuit, batteries A and A′ being in opposition. The line windings of the relays consequently do not set up magneto-motive forces in the relay cores, but the local windings thereof create fluxes therein of such directions that the armatures of the relays close the circuits of the sounders S and S′. If now the operator at X opens his key to transmit a spacing signal to Y, he connects batteries D and A′ in conjunction in the line circuit, so that current traverses the line windings of the relays, creating in relay R a magneto-motive force of the same direction as that of its local winding and creating in relay R′ a magneto-motive force, the direction of which is opposed to that of the local winding. The value of the current in the line circuit and the number of turns in the line windings are such that in each relay the line magneto-motive force is substantially of twice the magnitude of the local magneto-motive force, so that the resultant flux in relay R′ is opposite in direction to, and of substantially the same value as the local flux, whereas in relay R the resultant is in the same direction as the local flux. As a result relay R′ opens the circuit of its sounder, whereas relay R retains its sounder circuit closed. The spacing signal is thus given at Y.

When the operator at X closes his key to transmit a marking signal to Y, he disconnects battery D from the line and associated battery A therewith, so that current ceases to flow in the line windings. The line magneto-motive forces of the relays are therefore extinguished with the result that relay R remains with its contact in the closed position, whereas relay R' operates its contact from the open to the closed position, causing sounder S' to give the marking signal.

In case the operator at Y desires to "break" the message from X, he opens his key so that battery D' is connected to the line circuit instead of batter A'. If the key at X is closed at this instant in the closed position, i. e. transmitting a marking signal, there will be a flow of current in the line circuit of such direction that the line magneto-motive force in relay R opposes the local magneto-motive force thereof, whereas the line flux of R' augments its local flux. There is consequently a reversal of flux in relay R and an opening of the sounder circuit at station X. Since this circuit should be closed at the time when X is transmitting, the opening thereof will serve to notify the operator that Y is "breaking" the message. To take the message from Y the operator at X closes his key, so that when Y is transmitting a marking signal, the battery A is in opposition to A', thus bringing about a closure of the sounder circuit at X, and when Y is sending a spacing signal, battery A is in conjunction with D' and causes the opening of the sounder S.

Although only one form and arrangement of apparatus and circuits embodying the invention is shown and described herein, it is readily understood that various changes and modifications may be made therein within the scope of the following claims without departing from the spirit and scope of the invention.

What I claim is:

1. In a telegraph system, a plurality of polarized relays, a line circuit for associating said relays, said circuit comprising transmitting devices, one adjacent to each relay said devices having four different relative positions, a source of positive and a source of negative potential associated with each of said transmitting devices and arranged to cause flow of current in said line circuit in one direction for the first relative position of said devices, in the opposite direction for the second relative position of said devices, and to prevent the flow of current in said circuit for the remaining two relative positions of said devices; line windings for said relays included in said line circuit and arranged to cause magneto-motive forces of one direction or the other, according to the direction of flow of current in the line circuit; local windings for said relays for creating in each a local magneto-motive force the effective value of which is substantially half that of the line magneto-motive force, and the direction of which, in one relay, is in opposition to that of the line magneto-motive force and in the other relay in conjunction therewith, when the said transmitting devices are in one of the said relative positions, and signaling devices governed by said relays.

2. A single telegraph system comprising a plurality of stations, a line wire entering each station, a plurality of polarized relays, one at each station with a line wire winding thereon, a local winding for each relay for normally creating a biasing magneto motive force therein, a transmitting device at each station associated with the line with said relay between it and the line, and means associated with said devices for at times creating in the adjacent relay a magneto motive force of the same effective direction as said biasing force, and in the distant relay a magneto motive force of opposite direction to said biasing force.

3. In a telegraph system, a plurality of stations, a line circuit extending therebetween, polarized relays associated with said circuit, means for each relay for biasing the same into one position, and means at each station for at times causing operation of the relay at the distant station without causing the operation of the relay at the home station, each said relay being operatively connected in the line circuit at a point between the line and the said last mentioned means.

4. In a telegraph system, a plurality of stations, a line circuit extending therebetween, polarized relays associated with said circuit, means for each relay for biasing the same into one position, sources of current of the same magnitude at said stations, having positive and negative potentials, and transmitting devices associated therewith for connecting said sources alternatively and in like relation to the line so that the connected sources at opposite ends shall be in conjunction for one signal and in opposition for another signal.

5. In a telegraph system, a line circuit, respective relays at the ends thereof having windings permanently connected to the line, means normally biasing said relays, and transmitting means comprising opposite voltage sources at each end of the line and associated therewith so that said relay windings are between such transmission means and the line at the respective ends of the line.

6. In a telegraph system, a line circuit, relays at the ends, each having a winding in series with the line, independent means normally biasing said relays, transmitting means at the ends of the line normally in marking position, and grounding the ends of the line through a battery, and opposite batteries to be connected to the line by the spacing condition of the transmitting means.

7. In a telegraph system, a line circuit, relays at the ends of the line with windings permanently connected in series with the line, transmitting means associated with the ends of the line, a pair of opposite batteries at each end of the line, one of them being normally connected thereto and the other normally disconnected, and a key to interchange these connections in alternative and like relation to the line and the relays.

In testimony whereof, I have signed my name to this specification this 28th day of June 1920.

JOHN M. FELL.